United States Patent [19]

Holland et al.

[11] Patent Number: 4,747,134
[45] Date of Patent: May 24, 1988

[54] PAY TELEPHONE HOOK SWITCH ASSEMBLY

[75] Inventors: Eddie L. Holland; David E. Jekot, both of Cumming, Ga.

[73] Assignee: Phillips & Brooks, Inc., Cumming, Ga.

[21] Appl. No.: 57,327

[22] Filed: Jun. 4, 1987

[51] Int. Cl.⁴ .................. H01H 21/08; H01H 21/82; H04M 1/08
[52] U.S. Cl. .................. 379/424; 200/5 R; 200/303; 379/145; 379/437
[58] Field of Search ............... 379/424, 426, 145, 143, 379/155, 437; 200/5 R, 303

[56] References Cited

U.S. PATENT DOCUMENTS

| | | | |
|---|---|---|---|
| 3,365,554 | 1/1968 | Brzezinski | 379/362 |
| 4,130,742 | 12/1978 | Lindman et al. | 379/424 |
| 4,326,108 | 4/1982 | Barkow et al. | 379/424 |
| 4,424,420 | 1/1984 | Haskins | 379/424 |
| 4,436,964 | 3/1984 | Haskins | 379/427 |
| 4,456,799 | 6/1984 | Haskins | 200/5 R |
| 4,572,930 | 2/1986 | Kakuta et al. | 200/5 R |
| 4,692,940 | 9/1987 | Baines | 379/424 |

FOREIGN PATENT DOCUMENTS 1151020  7/1963  Fed. Rep. of Germany ...... 379/426

Primary Examiner—Thomas W. Brown
Attorney, Agent, or Firm—Jones, Askew and Lunsford

[57] ABSTRACT

A telephone hook switch assembly has a housing which defines first and second cavities and a shaft rotatably mounted in the housing. A hook switch lever is mounted on the shaft and is rotatable therewith in the first housing cavity. A switch assembly having snap-action switches is positioned in the second housing cavity. The snap-action switches open and close in a predetermined sequence in response to rotation of the hook switch lever. The assembly provides superior isolation of the electrical contacts from environmental contaminants and is more rugged than conventional leaf spring and program card arrangements.

12 Claims, 5 Drawing Sheets

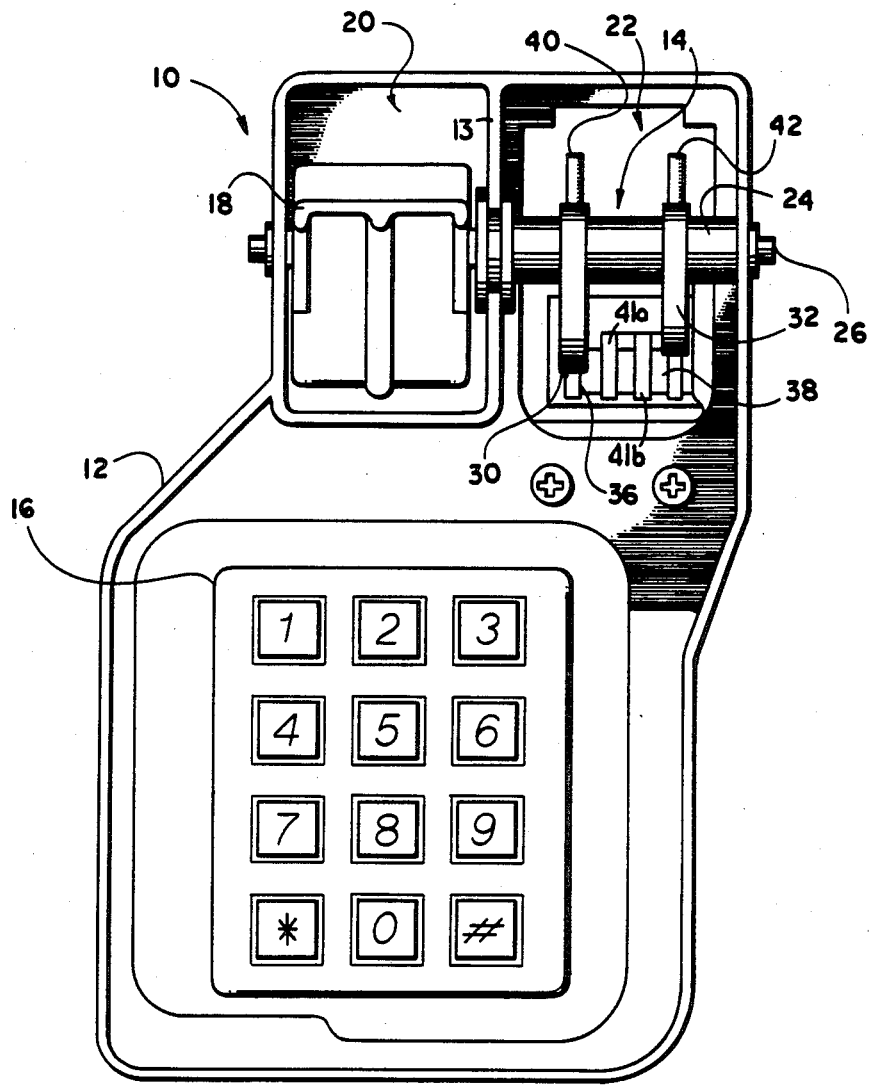
Fig_1

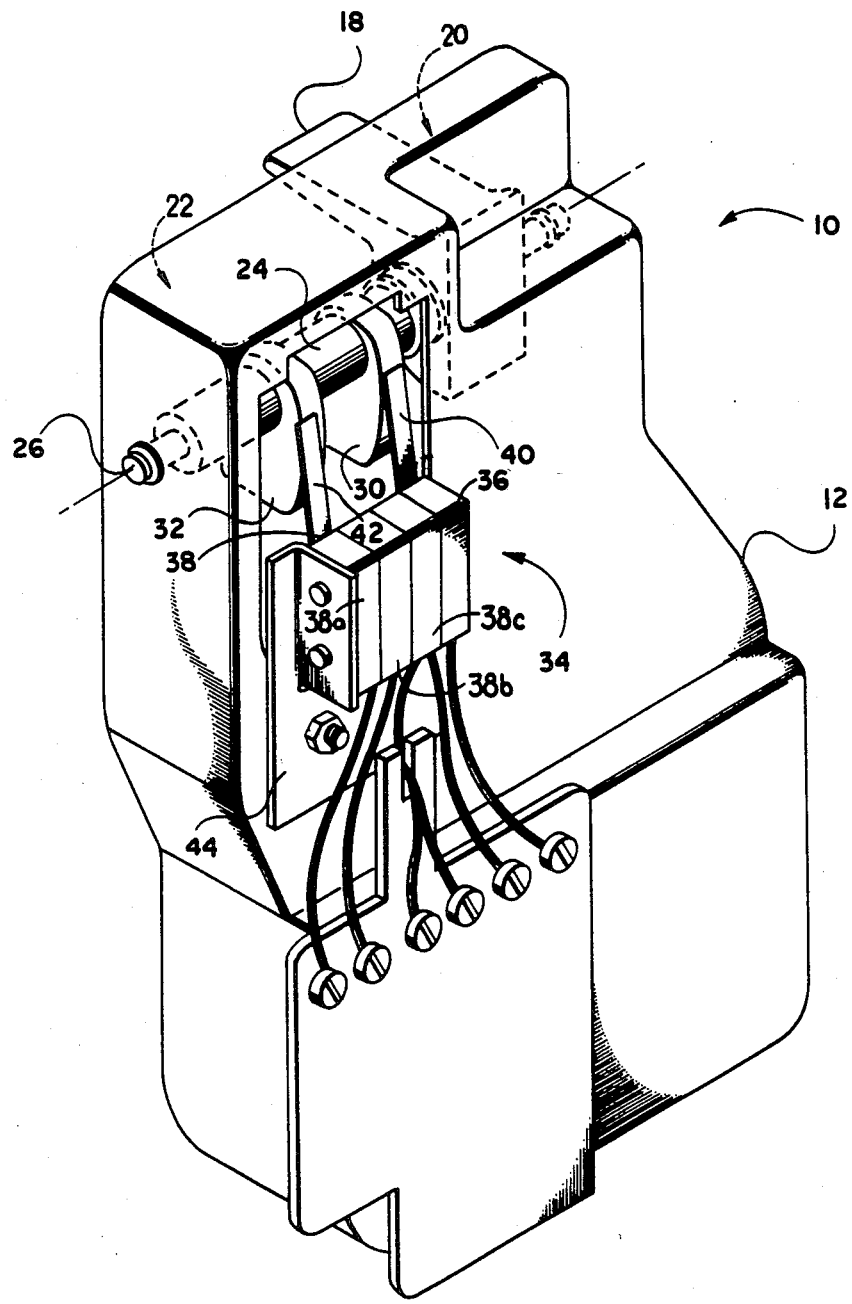

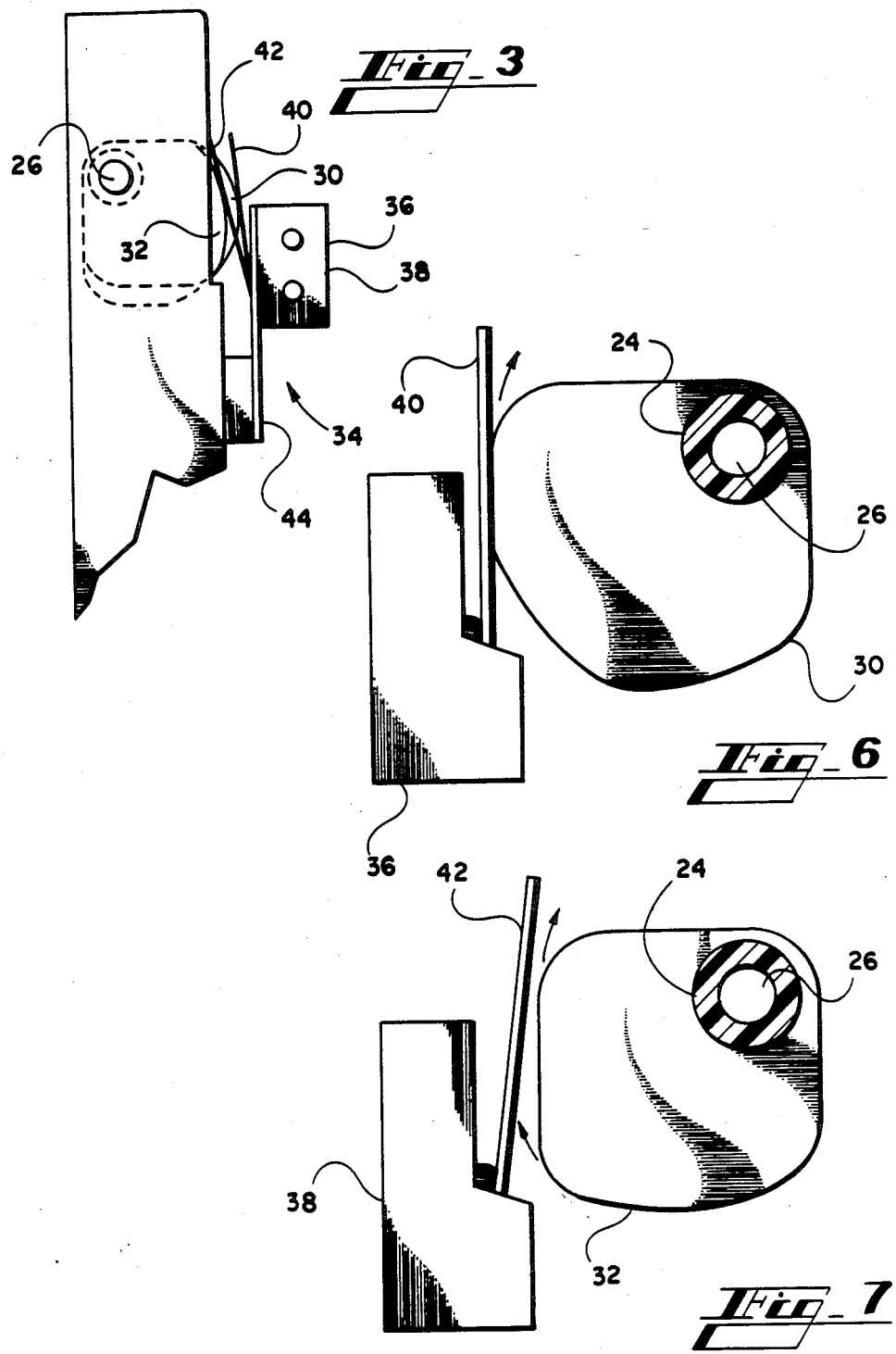

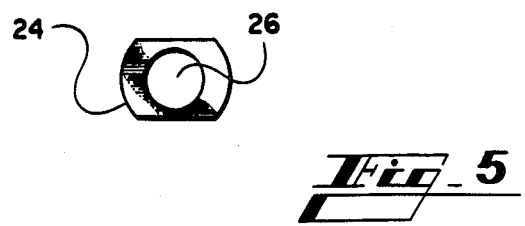
Fig_5
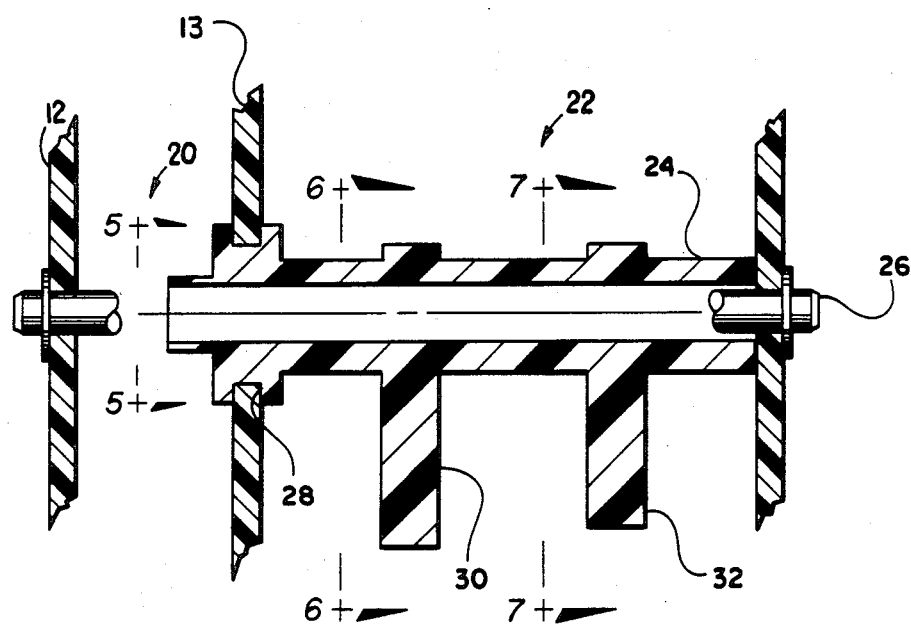
Fig_4

PAY TELEPHONE HOOK SWITCH ASSEMBLY

TECHNICAL FIELD

This invention relates generally to pay telephones, and more particularly relates to a hook switch assembly for such a pay telephone.

BACKGROUND OF THE INVENTION

People often abuse public pay telephones. Pay telephones also suffer abuse from the environment which is often laden with dust, chemicals and corrosive agents. The hook switch assembly is the recipient of much of the abuse. Typical hook switch assemblies include a hook switch lever for supporting the telephone receiver when the telephone is not in use, and typically contains several sets of switch contacts.

One problem with conventional hook switch assemblies is that the switch contacts, which are often leaf switches, are delicate and subject to damage or malfunctioning from dust or excessive motion. The excessive motion often results when the pay telephone is operated by rapidly or forcefully removing or replacing the receiver onto the hook switch lever. To limit the motion transmitted to the switch contacts, some conventional pay telephones limit the motion or travel of the hook switch lever. In addition, the contacts are typically positioned so that overtravel does not occur when the hook switch lever is operated. While repositioning the contacts may overcome the overtravel problem, it creates a new problem in that any wiping action of the switch contacts may be reduced or limited. As will be known to those skilled in the art, the wiping action of electrical contacts tends to keep the contacts clean, which is important in a dusty environment.

Dust and other environmental contaminants which might affect the operation of the switch contacts can enter the hook switch assembly through the opening in the telephone housing for the hook switch lever. One approach to reducing this problem is to physically isolate the switch contacts from the hook switch lever. Isolation has been accomplished in the past by forming cavities in the telephone housing, and by placing the hook switch lever in one cavity and the switch contacts in a separate cavity spaced apart from the hook switch cavity.

While isolating the switch contacts from the hook switch lever minimizes the exposure to dust, it does not completely eliminate all dust and the contacts will eventually become dirty and must be cleaned or replaced. In some conventional pay telephones, the telephone unit has to be disassembled to obtain access to the contacts for cleaning or replacement. It will thus be understood there is a need for a hook switch assembly wherein the contacts have a self-cleaning action which prolongs the life of the contacts, and wherein the need for disassembly and cleaning has been minimized.

Some conventional hook switch assemblies have contact arrangements with a relatively high number of parts. Since each part represents a potential trouble spot, it is beneficial to keep the number of parts as small as possible. U.S. Pat. No. 4,572,930 discloses a hook switch uses a plurality of movable terminals and a plurality of stationary terminals. U.S. Pat. No. 4,456,799 and related U.S. Pat. Nos. 4,436,964 and 4,424,420 disclose a hook, switch assembly which uses alignments of contact operating springs which are paired with a cam resting between opposed leaf springs.

Yet another hook switch assembly has the switch contacts enclosed in a plastic housing which minimizes the exposure to dust. However, this particular arrangement requires a lever controlled by a slotted program card to operate the contacts; the program card is operated by a cam which is actuated in response to motion of the hook switch lever. The program card is delicate and has been found in practice to fail often. Moreover, for the switch contacts to operate properly the cams and levers must be precisely aligned. It will be understood that it would be highly desirable to provide a cam switch assembly which minimizes the number of parts and is easy to align.

It is possible on some pay telephones to make calls by rapidly operating the hook switch lever to simulate the pulses of a typical telephone dial. To overcome this problem of hook switch dialing and prevent unauthorized calls from being made, some hook switch assemblies include a mercury switch which prevents hook switch dialing. U.S. Pat. No. 3,365,554 discloses such a mercury switch along with two cam operated leaf switches. In addition to being expensive, mercury is a hazardous, toxic, material. Understandably, it is highly desirable to have a hook switch assembly which prevents hook switch dialing without using mercury.

SUMMARY OF THE INVENTION

The above and other problems with prior art pay telephone hook switch assemblies are solved with the present invention. Briefly summarized, a pay telephone hook switch assembly constructed in accordance with the present invention includes a housing which defines first and second cavities. A shaft is rotatably mounted in the housing, and a hook switch lever is mounted on the shaft and is rotatable therewith in the first housing cavity. A switch assembly has snapaction switches with enclosed contacts positioned in the second housing cavity. Means responsive to rotation of the hook switch lever are provided for opening and closing the snap-action switches in a predetermined sequence.

More particularly described, the present invention provides a first cavity for housing the hook switch lever and a second, physically isolated cavity for housing the switch assembly. The second cavity is spaced apart from the first cavity. By separating the switch assembly from the environmentally-exposed hook switch lever, the switch assembly is protected from dust in the environment. The preferred snap-action switches have a wiping action and have positive opening and closng action which minimizes arcing of the contacts, thereby reducing wear and aging. The switch assembly also performs the function previously performed by the mercury switch so that a mercury switch is no longer necessary.

Accordingly, it is an object of the present invention to provide a pay telephone hook switch assembly which prolongs the life of the contacts by minimizing their exposure to dust. This object is achieved by positioning the switch assembly in a cavity in the housing isolated from the environment as well as isolated from the atmospherically exposed hook switch lever cavity. The effects of dust are also minmized by the wiping action of the switch contacts.

Additionally, the assembly may be easily configured for use in pay first applications as well as other applications by merely providing or omitting an option switch.

All other components, such as the cam shaft and cams, remain the same.

It is another object of the present invention to provide a more rugged hook switch assembly for pay telephones than is provided with conventional leaf switch and program card arrangements.

Another object of the present invention is to provide a pay telephone hook switch assembly which thwarts efforts at hook switch dialing without the use of a mercury switch. This object is achieved with the switch assembly which has an option switch to prevent hook switch dialing.

Another object of the present invention is to provide a simple hook switch assembly having a relative few parts which are easy to align. This object is achieved by the use of snap-action switches actuated in response to rotation of the hook switch lever to open and close in a predetermined sequence.

It is another object of the present invention to provide an easily constructed hook switch assembly. This object is accomplished by utilizing easily molded plastic cams and other components. The plastic facilitates low friction, sliding contact between the cams and actuator arms. The low friction extends the life of the plastic cams because they will not easily wear.

It is another object of the present invention to provide an improved hook switch assembly which does not require an easily misaligned program card arrangement for sequencing the switches.

It is another object of the present invention to provide an improved switch sequencing apparatus for pay telephones which employs sealed snap action switches which are sealed and isolated from the hook switch lever and hook switch lever cavity.

It is another object of the present invention to provide an improved telephone hook switch assembly for pay telephones which may be easily configured for use in pay-first applications as well as other applications, with only the simple provision or omission of a single simple element.

It is another object of the present invention to provide an improved pay telephone hook switch assembly which may be employed in existing pay telephones without modification or change of the components in existing telephones.

These and other objects, features, and advantages of the present invention may be more clearly understood and appreciated from a review of the following detailed description of the preferred embodiment and by reference to the appended drawings and claims.

BRIEF DESCRIPTION OF THE DRAWINGS

FIG. 1 is a diagrammatic front view of a preferred embodiment of a pay telephone incorporating a hook switch assembly constructed in accordance with the present invention.

FIG. 2 is a diagrammatic rear view of the pay telephone illustrated in FIG. 1.

FIG. 3 is a diagrammatic side view taken from the left side of FIG. 2.

FIG. 4 is a diagrammatic longitudinal cross sectional view of a preferred embodiment of a cam shaft constructed in accordance with the present invention.

FIG. 5 is a diagrammatic end view of the cam shaft illustrated in FIG. 4 taken in the direction of line 5—5 of FIG. 4.

FIG. 6 is a view taken in the direction of line 6—6 of FIG. 4.

FIG. 7 is a view taken in the direction of line 7—7 of FIG. 4.

DETAILED DESCRIPTION OF THE PREFERRED EMBODIMENT

Figure 8:
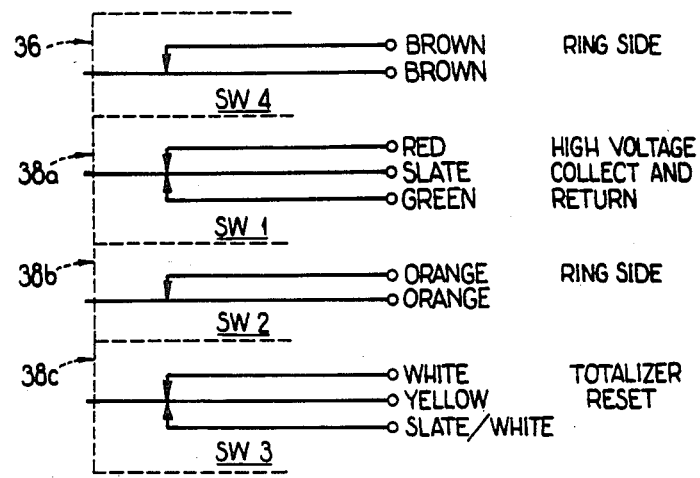
FIG. 8 is a schematic diagram of the electrical connections of the preferred embodiment illustrated in FIG. 1.
Figure 9:
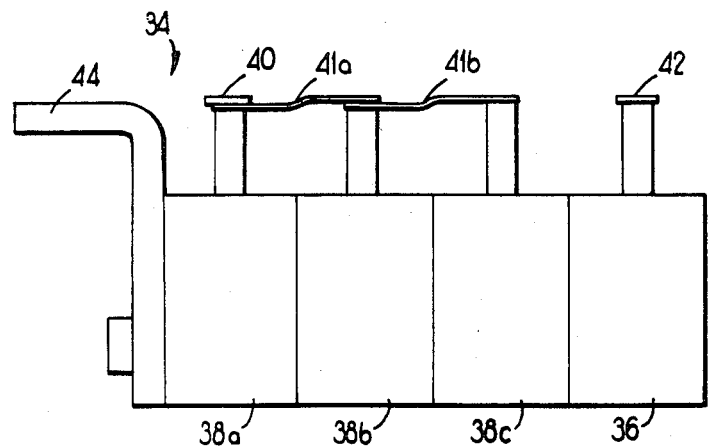
FIG. 9 is a top diagrammatic view of the switch assembly of the preferred embodiment illustrated in FIGS. 1 and 2.

Referring now to the drawings, in which like numerals indicate like elements throughout the several figures, FIGS. 1 and 2 illustrate the preferred embodiment of a pay telephone station 10 which is constructed in accordance with the present invention. The telephone station 10 comprises a housing 12 which encloses a hook switch assembly 14 including a spring-loaded hook switch lever 18, and a dialing means such as push buttons 16. The housing 12 is preferably a unitary structure which can be easily inserted and removed from the telephone station 10. The dial and hook switch assembly housing can be constructed of metal, but easily molded, low friction plastic materials, such as glass-filled polycarbonate or nylon, are preferred.

The telephone station 10 provides a housing into which the various operational assemblies are inserted to provide protection from the environment. A cover (not shown) is placed over the housing 12 after it is inserted into the telephone station 10 to provide further protection from the environment. When installed, the area around the housing is protected from the environment except for a small area around the hook switch lever 18. The housing 12 preferably forms a first cavity 20 and a second cavity 22 separated from one another to minimize the travel of air and contaminate dust from the hook switch lever cavity 20 to the switch cavity 22.

A cam shaft 24 is rotatably mounted in the assembly housing 12 and extends through the cavities 20, 22. The cam shaft 24 may pivot in openings formed in the assembly housing 12 or, more preferably, rotates on a pivot pin or pivot shaft 26. As illustrated, the first cavity 20 is positioned horizontally adjacent the second cavity 22 and the pivot pin 26 extends through each of the cavities 20, 22 horizontally and protrudes through openings in the sidewalls of the assembly housing 12. Preferably, the pivot pin 26 has a snap-ring affixed to each of its ends to maintain its position fixed in the housing. Preferably, the cam shaft 24 has a key configuration for engaging a slot in the hook switch lever 18 (FIG. 5).

Referring now to FIGS. 4 and 6–7, the cam shaft 24 defines a circumferential groove 28 in which rides the housing partition wall 13 separating the first and second assembly housing cavities 20, 22. The circumferential groove 28 is preferably a deep groove which allows a sufficient amount of the housing partition wall 13 to ride therein to form a dust barrier which retards the migration of dust from the switch lever cavity 20 into the switch cavity 22. The cam shaft 24 has two lobes or cams 30, 32 mounted thereon which rotate about the pin 26 with the cam shaft 24. The configuration of cam 30 differs from the curvature and configuration of cam 32 to open and close certain switches in a predetermined sequence, as will be more fully described below in connection with the switch assembly 34.

Referring to FIGS. 2–3, 6–7 and 9, the hook switch assembly 14 includes a switch assembly 34 which preferably contains an option switch 36 and one or more cam switches 38. The switches 36 and 38 are mounted in the second cavity 22 and are preferably snapaction switches such as a Cherry subminiature series E61-00H with a longitudinally extending actuating arm, manufactured by Cherry Electrical Products Corp., Waukegan, Ill. Each switch is a *separate* unit and is therefore *separately enclosed or sealed,* thereby providing additional environmental isolation for the contacts contained therein.

These preferred switches have a clean, positive making and breaking action with contact follow and wiping contact action. Preferably, the snap-action switch has a rest position the switch actuator assumes when no force is exerted against it. It also has pretravel, which is a specified distance the actuator moves from the rest position to the point of operation. The switch also has contact follow or overtravel, which is the continued switch actuator movement after initial contact transfer to give contact wiping action to keep the contacts clean. The point of actuation where the second or return contact transfer takes place is the reset point. At this point the contacts snap back to their rest position so that the contacts make and break at definite predetermined conditions.

The option switch 36 has a longitudinally extending switch actuator arm 40 which matingly engages the option cam 30 to open and close the option switch 36. The option switch 36 replaces the mercury switch which was used in the prior art, and thereby prevents hook switch dialing. The option switch 36 parallels the cam switch 38 and is configured to give a single switch closure per hook switch actuation. With the option switch 36 operating in conjunction with one of the cam switches 38, as will be described in greater detail below, only even numbers can be hook switch dialed. This effectively eliminates the possibility of hook switch dialing.

The cam switch 38 similarly has a switch actuator arm 42 which operates in response to contact from the cam 32. The option cam 30 is configured to contact switch actuator 40 and operate the option switch 36 prior to contact of the cam 32 with the switch actuator 42. In this manner a predetermined operating sequence is established wherein the option switch 36 actuates before the cam switches 38 so that hook switch dialing cannot be accomplished.

Referring to FIGS. 2 and 3, the switch assembly 34 includes a mounting bracket 44 which conveniently mounts both the option switch 36 and the cam switch 38. The mounting bracket conveniently connects to the back of the assembly housing 12 and fits flat on the back. The bracket 44 has a general "L" configuration with one leg of the "L" extending generally parallel to the second cavity 22. The one leg of the "L" has a protrusion which has openings for receiving screws to hold switches 36, 38 in place in the cavity 22.

As seen in FIG. 2, the screws are accessible in the protrusion of the mounting bracket 44 prior to installation of the assembly 14 in the telephone station 10. With this arrangement, it is a simple matter to add or remove the option switch as desired for the particular location. The decision on use of the option switch will depend upon whether the dialing mechanism 16 is a pulse type dialing apparatus such as a regular rotary dial, or a push button dialing mechanism such as a touch tone dialer. Hook switch dialing is not possible with some types of touch tone equipment so that the option switch is not needed for these types and can be omitted during manufacture or removed in the field.

Operation of the present invention is believed to be apparent from the foregoing description but a few words will be added for emphasis. A person desiring to make a phone call simply removes the telephone receiver from the hook switch lever 18 causing the spring-loaded hook switch lever 18 to rotate up from the position shown in FIG. 1. This causes the cam shaft 24 to similarly rotate about the pin 26 in a clockwise direction as illustrated in FIGS. 6 and 7.

As best shown in FIG. 3, rotation of the option cam 30 causes the option cam 30 to contact the actuator arm 40 for the option switch 36 to actuate the option switch 36 thereby preventing hook switch dialing. Because of the configuration of the cams, the option switch 36 is actuated *prior to* actuation of the cam switch 38. The cam switch 38 is actuated when the actuator arm 42 is contacted by the cam 32 which occurs *after* contact of actuator arm 40 by the cam 30. In this manner, the option switch always operates first to prevent the possibility of hook switch dialing.

In one model of a switch assembly which was constructed in accordance with the present invention, the option switch 36 operated within about 8 to 10 degrees of travel of the hook switch lever 18. This particular assembly had three cam switches 38a, 38b, 38c ganged with horizontally-extending gang arms 41a, 41b (FIGS. 1 and 9) engaging the lever 40 causing all three cam switches to begin motion simultaneously. The first of the cam switches 38a actuated at about 15 degrees of rotation of the switch lever 18 above the cam 26. The second cam switch 38b actuated after about a total of 20 degrees, and the third switch 38c actuated after about 25 degrees of rotation of the hook switch lever 18. it will thus be appreciated that the combination of the three cam switches 38a, 38b, 38c, with their actuation at different degrees of rotation, ganged together with gang arms 41a, 41b, provide means for sequencing the actuation of the switches. This obviates the use of leaf switches and a program card.

FIG. 8 is a schematic diagram of the electrical connections to the option switch 36 and various cam switches 38a, 38b, 38c. Those skilled in the art will understand and appreciate that these connections allow operation of the preferred embodiment of the present invention as a conventional pay telephone. In particular, it will be noted that both option switch 36 and cam switch 38b are connected to the ring side of the telephone line. Inasmuch as the option switch 36 will be actuated first, followed shortly thereafter by actuation of the cam switch 38b, effectively two pulses are transmitted over the ring side of the line per hook switch actuation. This effectively prevents hook switch dialing because only even numbers can be dialed.

It will now be appreciated that there has been presented a pay telephone hook switch assembly which isolates the contact switch assembly from the hook switch lever assembly thereby preventing dust and other environmental contaminants present around the hook switch lever from affecting the hook switch assembly. It will be appreciated that the switch assembly utilizes positive, snap-acting switches which have positive contact wiping action and are sealed from the environment. The switches have switch actuator arms which engage the cams of the cam shaft to open and close the snap-action switches in an appropriate sequence for operation as a conventional pay telephone.

By utilizing these switch actuators and cams, there is no critical alignment of the switches with a delicate program card or with other parts of the hook switch assembly. Similarly, wear of the cam shaft or the hook switch lever where it is attached to the cam shaft will not effect operation of the snap-action switches. Further, the cam and switch arrangement eliminates the need to use mercury switches or the like.

As will be evident from the foregoing description, certain aspects of the invention are not limited to the particular details of the examples illustrated, and it is therefore contemplated that other modifications or applications will occur to those skilled in the art. For example, while the invention has been described in detail for a public pay telephone, it is apparent that the same structure may be equally applicable to other telephones where sequential circuits are used. It is accordingly intended that the claims shall cover all such modifications and applications as do not depart from the true spirit and scope of the invention.

What is claimed is:

1. A telephone hook switch assembly, comprising:
   a housng defining first and second cavities;
   a shaft rotatably mounted in the housing;
   a hook switch lever mounted on the shaft and rotatable therewith in the first housing cavity;
   a switch assembly having snap-action switches positioned in the second housing cavity; and
   sequencing means, responsive to rotation of said hook switch lever, for opening and closing said snap-action switches in a predetermined sequence.

2. The telephone of claim 1 wherein said sequencing means comprises:
   a cam mounted on said shaft and rotatable therewith in the second housing cavity; and
   a switch actuator operating said snap-action switches, said actuator being positioned in close proximity to said cam and movable by said cam in response to a predetermined amount of rotation of said shaft.

3. The telephone of claim 2 wherein said cam moves said switch actuator to operate said snap-action switch in response to about 10 degrees rotation of said shaft.

4. The telephone of claim 2 wherein said cam contacts said switch actuator and operates said snap-action switches, a first of said snap-action switches operating in response to about 15 degrees rotation of said cam, and second one of said switches operating after about 20 degrees of rotation of said shaft.

5. The telephone of claim 4 wherein a third snap-action switch operates after about 25 degrees of rotation of said shaft.

6. The telephone of claim 1 including first and second cams mounted on said shaft and rotatable therewith, said first cam being positioned for operating a first one of said snap-action switches in response to a first preselected amount of rotation of said shaft and second cam being positioned for actuating another of said snap-action switches in response to further rotation of said shaft.

7. The telephone of claim 6 wherein the said first cam operates the first snap-action switch in response to about 10 degrees of rotation.

8. An improved pay telephone hook switch, comprising:
   a switch housing for mounting within a conventional pay telephone housing;
   means defining first and second cavities within said switch housing;
   wall means for separating said first and said second cavities when said switch housing is mounted within said pay telephone housing to prevent introduction of dust or contaminants from said first cavity into said second cavity;
   a pivot shaft mounted within said first and said second cavities;
   a hook switch lever mounted for rotation on said pivot shaft within said first cavity;
   a cam shaft mounted for rotation on said pivot shaft within said second cavity, said cam shaft rotating when said hook switch lever is actuated;
   flange means associated with said cam shaft for providing a dust barrier between said first and said second cavities;
   a first cam having a plurality of cam faces and mounted on said cam shaft for rotation therewith;
   a plurality of separately enclosed first switches having wiping action contacts mounted for actuation by said first cam; and
   sequencing means for actuating said plurality of first switches in a predetermined sequence corresponding to said plurality of first cam faces.

9. The improved pay telephone hook switch of claim 8, further comprising a second cam having a plurality of cam faces and mounted on said cam shaft for rotation therewith, a separately enclosed second switch having wiping action contacts mounted for actuation by said second cam, said second switch actuating at a different time from a particular one of said first switches, and wherein said particular one of said first switches and said second switch are electrically connected to provide a plurality of dial pulses.

10. The improved pay telephone hook switch of claim 9, wherein said first cam and said second cam are integrally formed as a single unit.

11. The improved pay telephone hook switch of claim 9, wherein said cams are formed of plastic and make low friction contact with said switches.

12. The improved pay telephone hook switch of claim 9, wherein said sequencing means comprises a primary actuating arm for engaging said first cam, means associated with said plurality of first switches for actuating said first switches at different degrees of travel of an individual actuating arm associated with each of said first switches, and means for ganging said individual actuating arms together for common actuation by said primary actuating arm.

* * * * *